(12) United States Patent
Kwon et al.

(10) Patent No.: US 9,003,839 B2
(45) Date of Patent: Apr. 14, 2015

(54) LAUNDRY MACHINE

(75) Inventors: Ig Geun Kwon, Changwon-si (KR); Min Gyu Jo, Seoul (KR); Hyun Seok Seo, Seoul (KR); Soo Bong Kim, Changwon-si (KR)

(73) Assignee: LG Electronics Inc., Seoul (KR)

( * ) Notice: Subject to any disclaimer, the term of this patent is extended or adjusted under 35 U.S.C. 154(b) by 751 days.

(21) Appl. No.: 13/258,732

(22) PCT Filed: May 27, 2010

(86) PCT No.: PCT/KR2010/003381
§ 371 (c)(1),
(2), (4) Date: Sep. 22, 2011

(87) PCT Pub. No.: WO2010/137896
PCT Pub. Date: Dec. 2, 2010

(65) Prior Publication Data
US 2012/0011899 A1  Jan. 19, 2012

(30) Foreign Application Priority Data

May 28, 2009  (KR) ........................ 10-2009-0047192
Aug. 27, 2009  (KR) ........................ 10-2009-0079829
Aug. 27, 2009  (KR) ........................ 10-2009-0079909
May 18, 2010  (KR) ........................ 10-2010-0046454

(51) Int. Cl.
*D06F 37/22* (2006.01)
*D06F 37/26* (2006.01)
*D06F 25/00* (2006.01)
*F16F 15/02* (2006.01)

(52) U.S. Cl.
CPC .............. *D06F 37/22* (2013.01); *D06F 37/269* (2013.01); *D06F 25/00* (2013.01); *D06F 37/266* (2013.01); *D06F 37/268* (2013.01); *F16F 15/022* (2013.01)

(58) Field of Classification Search
CPC .............................. D06F 37/22; D06F 37/269
USPC ............................................. 68/23.1, 24, 140
See application file for complete search history.

(56) References Cited

U.S. PATENT DOCUMENTS 2,579,472 A * 12/1951 Chamberlin et al. .......... 68/23.1
2,836,046 A *  5/1958 Smith ............................ 68/23.2
3,022,656 A    2/1962 Bergeson et al. ............... 68/207
(Continued)

FOREIGN PATENT DOCUMENTS

AU       28020 77 A    2/1979
CN       1296536 A     5/2001
(Continued)

OTHER PUBLICATIONS

Chinese Office Action dated Oct. 10, 2012 issued in Application No. 200980155600.2 (with English translation).
(Continued)

*Primary Examiner* — Joseph L Perrin
(74) *Attorney, Agent, or Firm* — Ked & Associates, LLP (57) ABSTRACT

A laundry machine is provided that includes a tub to receive wash water, a drum rotatably disposed in the tub, a shaft connected to the drum, a bearing housing to support the shaft, a tub back including a rim that extends in a front to rear direction and coupled to the bearing housing at a front thereof, a rear gasket coupled to the rim of the tub back, and a suspension configured to reduce vibration of the drum. The rear gasket is connected between the tub back and the tub rear.

20 Claims, 10 Drawing Sheets

(56) References Cited

U.S. PATENT DOCUMENTS

| | | | |
|---|---|---|---|
| 3,038,639 A | | 6/1962 | Anderson ........................ 222/70 |
| 3,066,522 A | * | 12/1962 | Steinmuller ..................... 68/23.2 |
| 3,089,326 A | * | 5/1963 | Belaieff .......................... 68/23.2 |
| 3,385,085 A | | 5/1968 | Engel ................................ 68/18 |
| 3,854,733 A | | 12/1974 | Wilson ............................ 277/82 |
| 5,105,636 A | | 4/1992 | Anastase et al. |
| 5,353,613 A | | 10/1994 | Smith et al. |
| 5,860,300 A | * | 1/1999 | Valent ................................ 68/24 |
| 6,148,647 A | | 11/2000 | Kabeya et al. .................. 68/140 |
| 6,354,115 B1 | | 3/2002 | Zahn |
| 7,536,882 B2 | * | 5/2009 | Kim et al. ........................ 68/24 |
| 7,571,625 B2 | * | 8/2009 | Chang ............................... 68/24 |
| RE41,621 E | | 9/2010 | Kim et al. |
| 2003/0121294 A1 | | 7/2003 | Ryu et al. |
| 2004/0123631 A1 | * | 7/2004 | Chang ............................. 68/23.1 |
| 2004/0163426 A1 | | 8/2004 | Kim et al. ........................ 68/23 |
| 2005/0274159 A1 | * | 12/2005 | Jeon et al. ...................... 68/23.1 |
| 2006/0016228 A1 | | 1/2006 | Chang et al. |
| 2006/0191302 A1 | | 8/2006 | Kim et al. |
| 2006/0196233 A1 | | 9/2006 | Kim et al. |
| 2006/0254321 A1 | * | 11/2006 | Lim et al. ..................... 68/12.01 |
| 2007/0017261 A1 | * | 1/2007 | Chang et al. ................... 68/23.1 |
| 2007/0137260 A1 | | 6/2007 | Shikamori et al. |
| 2008/0067879 A1 | | 3/2008 | Kim et al. |
| 2008/0307833 A1 | * | 12/2008 | Chang et al. ................... 68/23.1 |
| 2009/0107187 A1 | * | 4/2009 | Kim et al. ....................... 68/140 |
| 2009/0113943 A1 | | 5/2009 | Lee |

FOREIGN PATENT DOCUMENTS

| | | |
|---|---|---|
| CN | 1511997 A | 7/2004 |
| CN | 1707010 A | 12/2005 |
| CN | 1724742 A | 1/2006 |
| CN | 1932126 A | 3/2007 |
| CN | 1940166 A | 4/2007 |
| CN | 101046046 A | 10/2007 |
| CN | 201187000 Y | 1/2009 |
| DE | 297 16 968 U1 | 11/1997 |
| EP | 0 414 298 A1 | 2/1991 |
| EP | 0 655 523 A1 | 5/1995 |
| EP | 0 874 078 A2 | 10/1998 |
| EP | 1 040 257 A1 | 10/2000 |
| EP | 1 079 014 A1 | 2/2001 |
| EP | 1 094 144 A2 | 4/2001 |
| EP | 1 433 890 A2 | 6/2004 |
| EP | 1 433 891 A2 | 6/2004 |
| EP | 1 445 368 A2 | 8/2004 |
| EP | 1 605 088 A2 | 12/2005 |
| EP | 1 619 286 B1 | 1/2006 |
| EP | 1 688 531 A1 | 8/2006 |
| EP | 1 746 192 A2 | 1/2007 |
| EP | 1 770 199 A2 | 4/2007 |
| EP | 1 840 257 A1 | 10/2007 |
| EP | 1 881 099 A1 | 1/2008 |
| FR | 2215503 A1 | 8/1974 |
| GB | 2 029 862 A | 3/1980 |
| GB | 2 174 513 A | 11/1986 |
| JP | 2006-068273 A | 3/2006 |
| JP | 2008-194090 A | 8/2008 |
| KR | 10-2005-0093253 A | 9/2005 |
| RU | 1772266 A1 | 10/1992 |
| SU | 986991 | 1/1983 |
| SU | 988691 | 1/1983 |
| WO | WO 2008/069607 A2 | 6/2008 |
| WO | WO 2008/099551 A1 | 8/2008 |
| WO | WO 2008/103007 A2 | 8/2008 |

OTHER PUBLICATIONS

European Search Report dated Oct. 26, 2012 issued in Application No. 10 78 0809.
Russian Decision to Grant a Patent dated Aug. 29, 2013 issued in Application 2011132013 (with English translation).
Chinese Office Action dated Mar. 20, 2013 issued in Application No. 201080017292.X (with English Translation).
Chinese Office Action dated Mar. 25, 2013 issued in Application No. 201080021205.8 (with English Translation).
Chinese Office Action dated Mar. 28, 2013 issued in Application No. 201080020149.6 (with English Translation).
Chinese Office Action dated Mar. 28, 2013 issued in Application No. 201080021234.4 (with English Translation).
Mexican Office Action dated Feb. 13, 2014 issued in Application No. MX/a/2011/007091 (with English translation).
European Search Report dated Feb. 19, 2014 issued in Application No. 10 78 0818.
European Search Report dated Feb. 24, 2014 issued in Application No. 10 78 0807.
International Search Report dated Oct. 15, 2010 issued in Application No. PCT/KR2009/008003.
International Search Report and Written Opinion dated Oct. 27, 2010 issued in Application No. PCT/KR2010/003381.
International Search Report dated Oct. 27, 2010issued in Application No. PCT/KR2010/003382.
International Search Report dated Nov. 24, 2010 issued in Application No. PCT/KR2010/003383.
European Search Report dated Aug. 1, 2012 issued in Application No. 09 83 6416.
International Search Report and Written Opinion dated Sep. 13, 2010 issued in Application No. PCT/KR2009/007967.
International Search Report and Written Opinion dated Oct. 27, 2010 issued in Application No. PCT/KR2010/003402.
International Search Report dated Oct. 27, 2010 issued in Application No. PCT/KR2010/003381.
Russian Decision to Grant a Patent dated Sep. 11, 2014 issued in Application No. 2011153799.
United States Office Action dated Sep. 18, 2014 issued in U.S. Appl. No. 13/259,670.
U.S. Office Action dated Nov. 17, 2014 issued in U.S. Appl. No. 13/142,633.
U.S. Office Action dated Nov. 20, 2014 issued in U.S. Appl. No. 13/259,626.
U.S. Office Action dated Jan. 14, 2015 issued in U.S. Appl. No. 13/320,676.

* cited by examiner

LAUNDRY MACHINE

TECHNICAL FIELD

The present invention relates to a laundry machine, more specifically, to a laundry machine which has an improved structure to improve washing efficiency.

BACKGROUND ART

Generally, laundry machines are electric appliances which remove various kinds of contaminants attached to clothes, beddings, cloth items and the like (hereinafter, laundry) by way of a friction force of water currents generated by rotation of a drum and a shock applied to laundry including clothes and the other items. A full-automatic laundry machine released in recent has a series of cycles including a washing, rinsing, dry-spinning cycle which are implemented automatically.

In stead of pulsator type laundry machine having a tub rotatable in a state of standing vertically, drum type laundry machines having little problems of entangled laundry and a lot of wrinkles generated in the laundry have been more and more popular recently.

As a structure of such a drum type laundry machine mentioned above is described schematically, the drum type laundry machine includes a cabinet configured to define an exterior appearance thereof, a tub located in the cabinet to receive wash water, with being supported by a damper an a spring, and a cylindrical drum located in the tub to receive laundry therein. The drum receives a driving force from a driving part to implement washing for the laundry loaded into the drum.

According to the structure of the drum type laundry machine mentioned above, the drum is rotated to wash and dry-spin the laundry loaded therein and it is vibrated because of the rotational force of the drum and eccentricity of the laundry. The vibration generated by the rotation of the drum may be transmitted outside via the tub and the cabinet.

Because of that, a spring and a damper are provided essentially between the tub and the cabinet to prevent the vibration transmitted to the tub from transmitted to the cabinet.

The drum type laundry machine mentioned above may be installed in an existing installation circumstance, for example, in a sink or built-in circumstance, not installed separately. As a result, the size of the drum type laundry machine may be installed limited to be adjustable to its installation circumstance.

As mentioned above, it is limited for the structure of the spring and damper dampening the vibration of the tub and the cabinet to change an inner structure of the drum type laundry. As the installation circumstance of the laundry machine is limited, it is limited to change the size of the laundry machine.

A lot of researches and developments have been in progress to improve washing capacities of laundry machines for user convenience and the increased washed laundry amount. However, it is difficult to enlarge the size of the tub in the conventional drum type laundry machine to increase the washing capacity, because of the limitation condition mentioned above.

As a result, laundry machines having various types of structures have been under development to improve the washing capacity as mentioned above.

DISCLOSURE OF INVENTION

Technical Problem

To solve the problems, an object of the present invention is to provide a drum type laundry machine having a new structure, different from the conventional laundry machine, specifically, a drum type laundry machine having a tub back arranged in front of a bearing housing and a rear gasket connected to the tub back.

Solution to Problem

To achieve these objects and other advantages and in accordance with the purpose of the invention, as embodied and broadly described herein, a laundry machine includes a tub configured to receive wash water; a drum rotatably installed in the tub; a shaft connected with the drum; a bearing housing configured to support the shaft; a tub back comprising a rim part to be coupled to the bearing housing, surrounding a front part of the bearing housing; a rear gasket coupled to the rim part of the tub back, the rear gasket connected between the tub back and the tub; and a suspension unit configured to support vibration of the drum suspendingly.

The rear gasket may be coupled to the rim part by a coupling force applied from the rim part toward a center of the tub back.

The laundry machine may further include a coupling ring configured to pressingly couple the rear gasket to the rim part from an outer direction of the rear gasket.

A predetermined portion of the rim part of the tub back to which the rear gasket may be coupled may be a slide-surface.

A seating part extended in a radial direction of the tub back may be formed in the rim part.

The tub may be supported by the suspension unit more rigidly than the drum is supported.

The suspension unit may be connected to the bearing housing.

The suspension unit may include a supporting bracket extended toward a front part of the bearing housing in parallel to the shaft and a cylinder damper configured to support the supporting bracket. The supporting bracket may extended in an rotational axis direction of the drum.

The tub may further include an opening formed in a front part thereof to load laundry therein and a door configured to open and close the opening.

In the meanwhile, according to the laundry machine, the tub may be fixedly installed or supported by a flexible structure such as the suspension unit. Or the supporting of the tub may be in the middle of the suspension supporting and the fixed supporting.

That is, the tub may be supported flexibly by using the suspension unit which will be described in detail in the description of the invention, or it may be supported more rigidly than the flexible supporting. For example, the tub may be supported by the suspension unit or a rubber bushing which can give a predetermined flexible motion to the tub, less flexible than the support by way of the suspension unit. Or the tub may be fixedly installed.

Examples of tubs supported more rigidly than the supporting of the suspension unit will be followed.

First of all, a predetermined portion of the tub may be integrally formed with the cabinet.

Second, the tub may be connected and supported by a screw, rivet, rubber bushing and the like or fixedly welled, adhered or sealed. In this case, the rigidity of the suspension unit is stronger than the rigidity of these connecting materials with respect to a vertical direction which is a main vibration direction of the drum.

Such the tub may be enlarged in a possible limited installation space. That is, the tub may be enlarged to be adjacent to a wall or frame, which limits the horizontal size of the installation space, with respect to at least a right and left direction orthogonal to a shaft direction if the shaft is horizontally installed. Here, the tub may be integrally formed with a right or left wall of the cabinet.

The tub may be closer to the wall or frame than to the drum in the right and left direction. For example, the tub may be 1.5 times or less as distant from the wall or frame by as from the drum. In the state of the tub enlarged in the right and left direction, the drum may be also enlarged in the right and left direction. As the right and left direction distance is getting smaller between the tub and the drum, the drum may be enlarged in the right and left direction as much. The right and left direction vibration of the drum may be put into consideration to reduce the right and left direction distance between the tub and the drum. As the right and left direction vibration of the drum is getting smaller, the diameter of the drum may be enlarged more. As a result, the right and left direction rigidity of the suspension unit configured to suspend the vibration of the drum may be larger than the other direction rigidity. For example, the rigidity of the suspension unit with respect to right and left direction displacement may be the maximum with respect to the other direction rigidity.

Furthermore, the suspension unit may be directly connected with the bearing housing configured to support the shaft connected with the shaft, different from the suspension unit connected via the tub according to the conventional laundry machine. That is, the bearing housing may include a supporting part configured to support the shat and an extending part extended from the supporting part. The suspension unit may be coupled to the supporting part or the extending part of the bearing housing.

At this time, the suspension unit may include a bracket extended with respect to the shaft direction and the bracket may be extended forward to the door.

The suspension unit may include at least two suspensions distant from each other in the shaft direction.

The suspension unit may include a plurality of suspensions installed below the shaft to standing-support a supporting object, for example, the drum. The suspension unit may include a plurality of suspensions installed beyond the shaft to hang the supporting object thereto. According to these cases, suspensions are provided only below or beyond the shaft.

The gravity center of the vibration system including the drum, shaft, bearing housing and motor may be located in at least predetermined portion adjacent to the motor with respect to a longitudinal shape of the drum.

At least one suspension may be in front or rear of the gravity center or suspensions may be installed in front and rear of the gravity center, respectively.

The tub may include an opening formed in a rear part thereof. A driving part including the shaft, bearing housing and motor may be connected with the tub via a flexible material. The flexible material seals the opening formed in the rear part of the tub to prevent wash water from flowing out of the tub via the opening and to enable the driving part to relative-move with respect to the tub. Such the flexible material may be any flexible material which can seal, for example, gasket material such as front gasket. In this case, the flexible material may be named as rear gasket corresponding to the front gasket. The connection of the rear gasket with the driving part may be implemented in a rotational constrained state with respect to the rotational direction of the shaft. According to an embodiment, the rear gasket may be directly connected with the shaft or it may be connected with the extending part of the bearing housing.

A predetermined portion of the driving part which is located in a front connection with the rear gasket only to be exposed to wash water may be made of anticorrosive material. For example, the portion may be coated or covered with an auxiliary plastic-made part, for example, a tub back which will be described in detail. If there is a metal-made portion of the driving part, the metal-made portion may not be exposed to water directly and corrosion may be prevented accordingly.

Here, the cabinet may not be provided, different from the embodiment of the present invention. For example, a built-in laundry machine may be provided in a wall, instead of the cabinet. That is, the laundry machine may be fabricated without the cabinet configured to define the exterior appearance of the laundry machine. Even in this case, the front part of the cabinet may be formed.

Advantageous Effects of Invention

The present invention has a following advantageous effect.

According to the laundry machine of the present invention, a drum type laundry machine having a totally different new structure is provided. As a result, the vibration of the drum is not transmitted to the tub and it may be suspendingly supported.

BRIEF DESCRIPTION OF DRAWINGS

The accompanying drawings, which are included to provide further understanding of the disclosure and are incorporated in and constitute a part of this application, illustrate embodiments of the disclosure and together with the description serve to explain the principle of the disclosure.

In the drawings.

BEST MODE FOR CARRYING OUT THE INVENTION

Reference will now be made in detail to the specific embodiments of the present invention, examples of which are illustrated in the accompanying drawings. Wherever possible, the same reference numbers will be used throughout the drawings to refer to the same or like parts.

Figure 1:
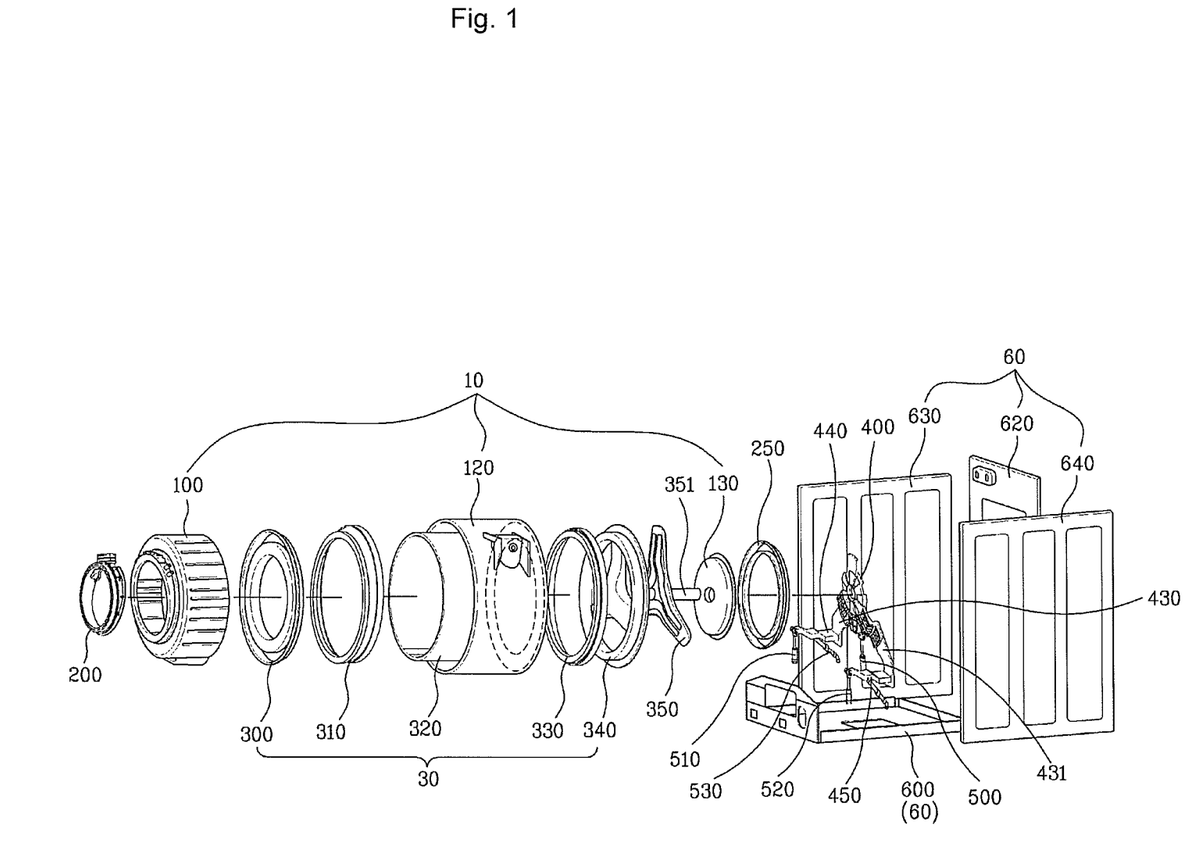
FIG. 1 an exploded perspective view illustrating a laundry machine according to an exemplary embodiment of the present invention.

FIG. 1 is an exploded perspective view illustrating a laundry machine according to an exemplary embodiment of the present invention.

As shown in FIG. 1, the laundry machine includes a tub fixedly installed in a cabinet 60. The tub 10 includes a tub front 100 configured to define a front of the tub 10 and a tub rear 120 configured to define a rear of the tub 10. The tub front 100 and the tub rear 120 are assembled by screws and a predetermined space is formed in the assembled tub front and tub rear 120 to accommodate a drum 30. The tub 10 may further include a tub back configured to form a rear surface of the tub 10 and the tub back is connected with the tub rear 120 via a rear gasket 250. The rear gasket 250 may be made of flexible material not to transmit the vibration of the tub back 130 to the tub rear 120.

The cabinet defines an exterior appearance of the laundry machine and it includes a cabinet front (not shown), a cabinet rear 620, a cabinet left 640, a cabinet right 630, a cabinet top (not shown) and a cabinet base 600.

The tub rear 120 has a rear surface 128 and the rear surface 128 of the tub rear 120, the tub back 130 and the rear gasket 250 forms a rear surface of the tub 10. The rear gasket 250 is sealed and connected with both of the tub back 130 and the tub rear 120, such that wash water inside the tub 10 may not leak. The tub back 130 is rotated together with the drum 30 when the drum 30 is rotated. At this time, the tub back 130 is distant from the tub rear 120 a predetermined distance not to interfere with the tub rear 120. Since the rear gasket 250 is made of flexible, the tub back 130 is relative-moved, not interfering with the tub rear 120. The rear gasket 250 may include a corrugated part (252, see FIG. 4) extendible enough to enable this relative-motion.

A foreign substance preventing material 200 is provided in a front part of the tub front 100 to prevent foreign substances from coming between the tub 10 and the drum 30. The foreign substance preventing material 200 is flexible material and it is fixedly installed to the tub front 100. Here, the foreign substance preventing material 200 may be made of a predetermined material identical to the material of rear gasket 250.

The drum 30 is configured of a drum front 300, a drum center 320 and a drum back 340. Ball balancers may be installed in front and rear parts of the drum 30, respectively. The drum back 340 is connected with a spider 350 and the spider 350 is connected with a shaft 351. The drum 30 is rotated in the tub 10 by a rotational force transmitted via the shaft 351.

The shaft 351 is directly connected with a motor, passing through the tub back 130. Specifically, a rotor (not shown) of the motor is directly connected with the shaft 351. A bearing housing 400 is coupled to the rear surface 128 of the tub back 130 and the bearing housing 400 rotatably supports the shaft 351, located between the motor and the tub back 130.

A stator is fixedly installed in the bearing housing 400 and the rotor is located around the stator. As mentioned above, the rotor is directly connected with the shaft 351. Here, the motor may be an outer rotor type motor connected with the shaft 351 directly.

A suspension unit (40, see FIG. 5) located from the cabinet base 600 to support the bearing housing 400. The suspension unit 40 includes three spring cylinder dampers 500, 5100, and 520 and two cylinder dampers 530 and 540 configured to obliquely support the bearing housing 400 in a forward and backward direction. The suspension unit 40 is connected to the cabinet base 600 flexibly to allow the drum 30 to move in forward/backward and rightward/leftward directions, not completely fixed to the cabinet base 600.

Figure 5:
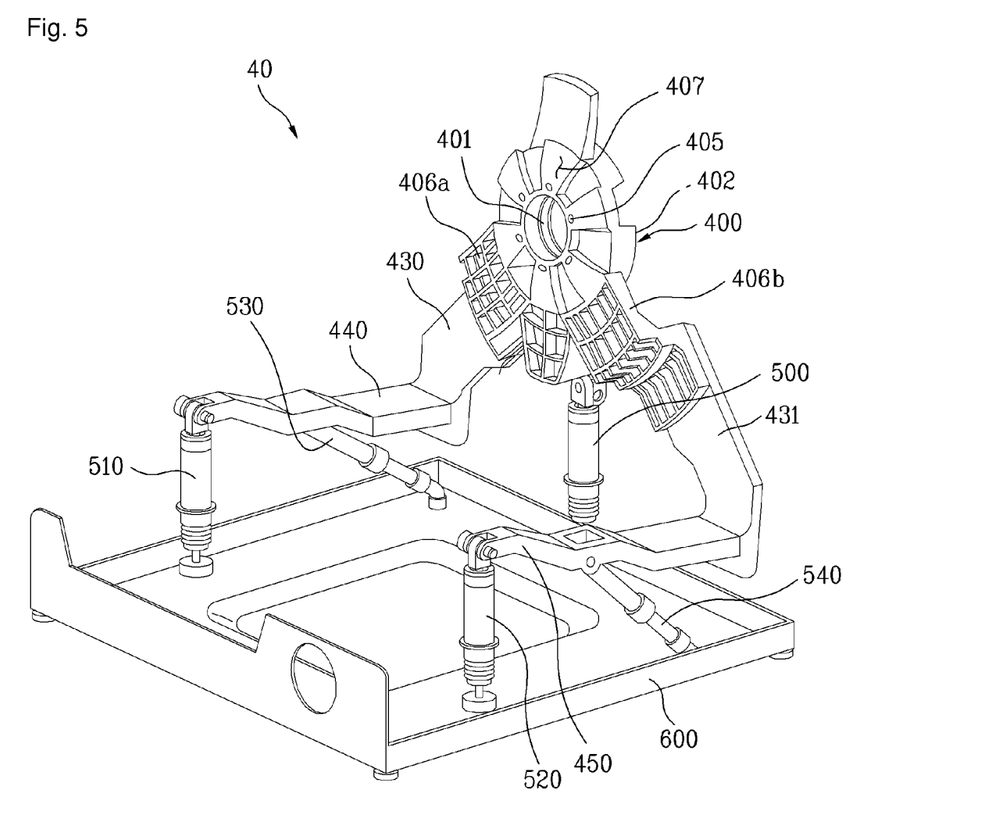
FIG. 5 is a perspective illustrating a suspension of the laundry machine.

That is, the suspension unit 40 is flexible enough to allow the predetermined forward/backward and rightward/leftward rotation of the drum 30 with respect to the supporting point of the suspension unit connected with the cabinet base 600. Perpendicular suspensions may be installed in the cabinet base 600 in the media of a rubber bushing (not shown). Perpendicular ones of the suspensions are used to suspend the vibration of the drum 30 elastically and oblique ones of them are used to dampen the vibration of the drum 30. That is, the perpendicular one is employed as spring out of a vibration system including a spring and damping means and the oblique ones as damping means.

The other parts of the tub 10 may be fixedly installed to the cabinet, except the tub back 130 and the vibration of the drum 30 is suspended and supported by the suspension unit. Substantially, each of the tub 10 and the drum 30 has a separate supporting structure. Even if the drum 30 is vibrated, the tub 10 may not be vibrated.

As follows, each element will be described in detail.

Figure 2:
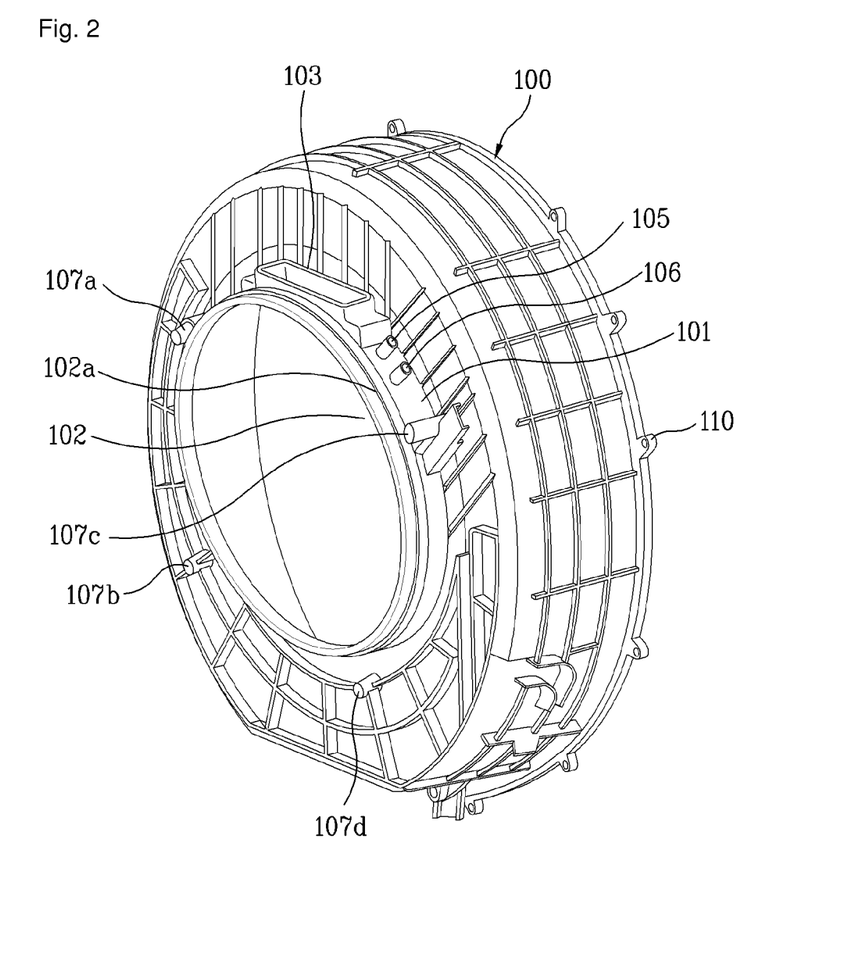
FIGS. 2 and 3 are perspective view illustrating a tub front of the laundry machine.
Figure 3:
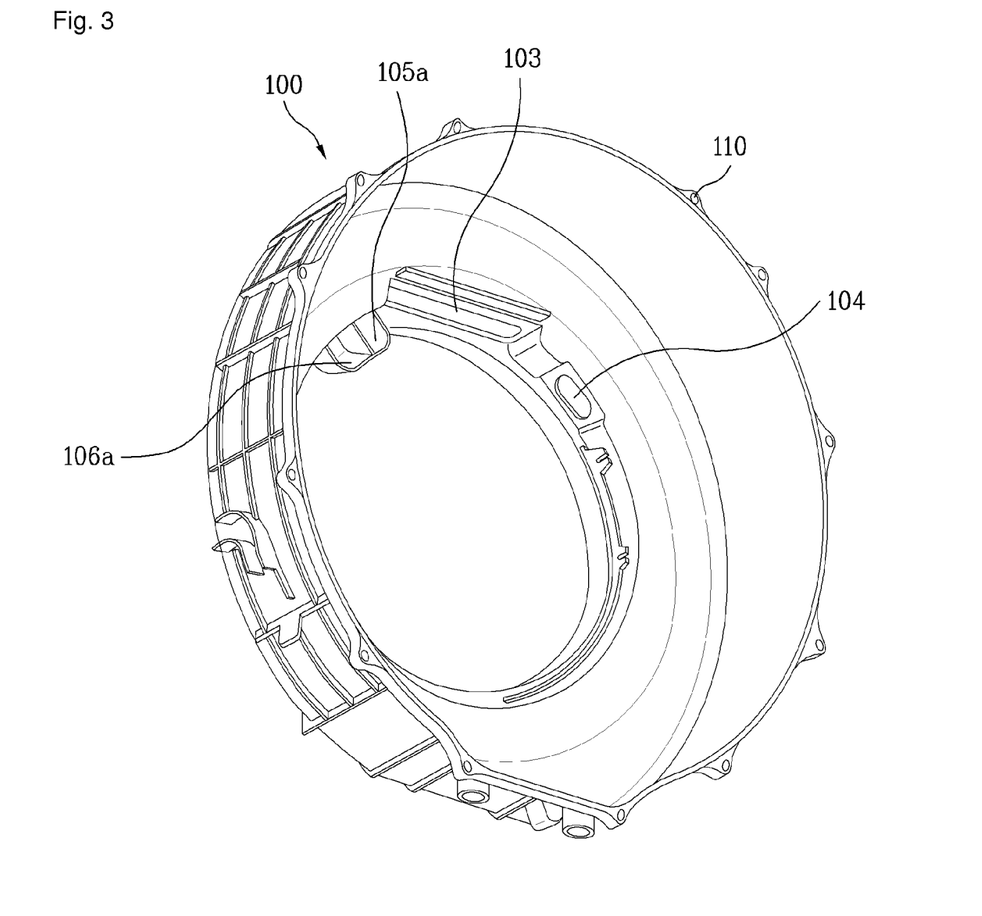

FIGS. 2 and 3 are diagrams illustrating the tub front 100. The tub front 100 includes a donut-shaped perpendicular front surface provided in a front portion of a cylindrical surface composing a predetermined portion of a side wall of the tub. A rear portion of the cylindrical surface is open as it is and the rear portion includes a plurality of securing holes 110 formed therein. The securing holes 110 are secured to corresponding securing holes (127, see FIG. 4) of the tub rear 120.

A rim part 101 is extended forward from an inner circumferential surface of the front surface of the tub front 100. The width of the rim part 101 is getting narrower downward from the top and substantially the rim part 101 may not be formed at a lower portion of an inner corner of the front surface.

In the rim part 101 may be formed a water supply inlet 104 configured to supply wash water, a hot air inlet 103 which will be used in a drying course, a circulating-water inlet 106 configured to drawn the wash water circulated by a circulation pump there through and a steam inlet 105 configured to draw steam there through.

Since the vibration of the tub 10 is noticeably reduced in the laundry machine according to the present invention, a water supply structure of a water supply hose, a drying structure of a drying duct and a steam supply structure, a circulating-water supply structure and the like may be implemented stably.

The hot air inlet 103 may be extended from the rim part 101 approximately in a square shape. Here, the hot air inlet 103 is required by a laundry machine having washing and drying functions and not by a laundry machine having no drying function.

The water supply inlet 104, the hot air inlet 103 and the like are formed in the front part of the tub front 100. Because of that, the supply of wash water, hot air and the like may be implemented in the front part of the tub 10.

The water supply inlet 104 and the other components may be located more forwardly than a front end of the drum 30 accommodated in the tub 10. As a result, the wash water, hot air and the like may be directly drawn into the drum 30 via the opening of the drum 30 configured to load the laundry therein or there out. Since fluidal material supplied to treat the laundry such as the wash water and hot air may be directly drawn into the drum 30 and this enables the laundry to be treated more efficiently.

In case detergent is supplied via a detergent box, together with the wash water, the detergent is directly drawn into the drum 30 and the amount of used detergent may be reduced accordingly, such that the amount of wash water may be reduced.

Here, a problem of tub contamination generated by detergent remnant loaded in a bottom of the tub may be solved. In case water is supplied from the front part of the tub, a door glass (not shown) may be washed by the supplied water advantageously.

Even if hot air is supplied via the front portion of the tub, a perpendicular surface of the tub front 100, that is, a front surface thereof, the hot air flow may be '⊂'-shaped, which is a complex air path formed by the hot air re-bent toward a perpendicular front surface of the tub after hot air having flown from the rear portion of the tub is bent downward from a front portion of a upper part of the tub. This '⊏'-shaped air path will not be helpful to efficient hot air flow. However, when the hot air inlet 103 is formed in the rim part 101 of the tub front 100, the hot air may be bent perpendicularly one time and it may flow smoothly.

The water supply inlet 104 and the other holes may be located beyond a center of the drum. Because of that, the wash water and the like may be supplied to the drum inside from a front upper portion of the drum. If it is necessary to supply the wash water and the like to the drum inside from a front lower portion of the drum, the rim part 101 of the tub front 100 may be formed in a lower portion of the front surface part 112. If it is necessary to supply the wash water and the like in a right and left direction, not in the upward and downward direction mentioned above, the rim part 101 may be formed in a inner corner center portion 131 of the front surface part 112. That is, the appearance of the rim part 101 may be variable according to which direction the supplied fluidal material is supplied along.

A coupling part 102 is formed in the rim part 101 to couple the foreign substance preventing material 200 to the tub front 100. The coupling part 102 is extended forward from the front end of the rim part 101, having a small cylindrical surface-like shape. Ribs 102*a* are formed in an outer circumferential surface of the small cylindrical surface.

Once the coupling part 102 is inserted in the foreign substance preventing part 200, the foreign substance preventing part 200 may be coupled to the coupling part 102, for that, inserting recesses (not shown) are formed in the foreign substance preventing material 200 and the small cylindrical surface having the ribs 102*a* formed therein is inserted in the inserting recess (not shown).

The tub front 100 is fixedly coupled to the cabinet front (not shown) and coupling bosses 107*a*, 107*b*, 107*c* and 107*d* are formed in the front surface of the tub front 100 for such the fixed coupling, approximately surrounding the rim part 101. After the cabinet front (not shown) is located in a state of the tub front 100 installed, screws are fastened backward to couple the tub front 100 to the cabinet front.

FIG. 3 is a rear view illustrating an inside of the tub front 100. The steam inlet 105 may be connected with a seam hose. A steam guide 105*a* is formed in the tub front 100 to guide steam drawn via the steam inlet 105 toward a drum inside and a circulating-water guide 106*a* is formed in the tub front 100 to guide circulating-water drawn via the circulating-water inlet 106 toward the drum inside. The steam inlet 105, the circulating-water inlet 106, the steam guide 105*a*, the circulating-water guide 106 and the like may be integrally formed with the tub front 100. The tub front 100 is plastic-injection-molded and the steam inlet 105 and the other components may be injection-molded as some parts of the tub front 100.

The tub front 100 is coupled to the tub rear 120 to form a predetermined space configured to accommodate the drum 30. Here, the tub front 100 and the tub rear 120 may be screw-fastened to each other. For this screw-fastening, a plurality of screw-securing holes 110 may be formed along a circumference of the rear part of the tub front 100.

Figure 4:
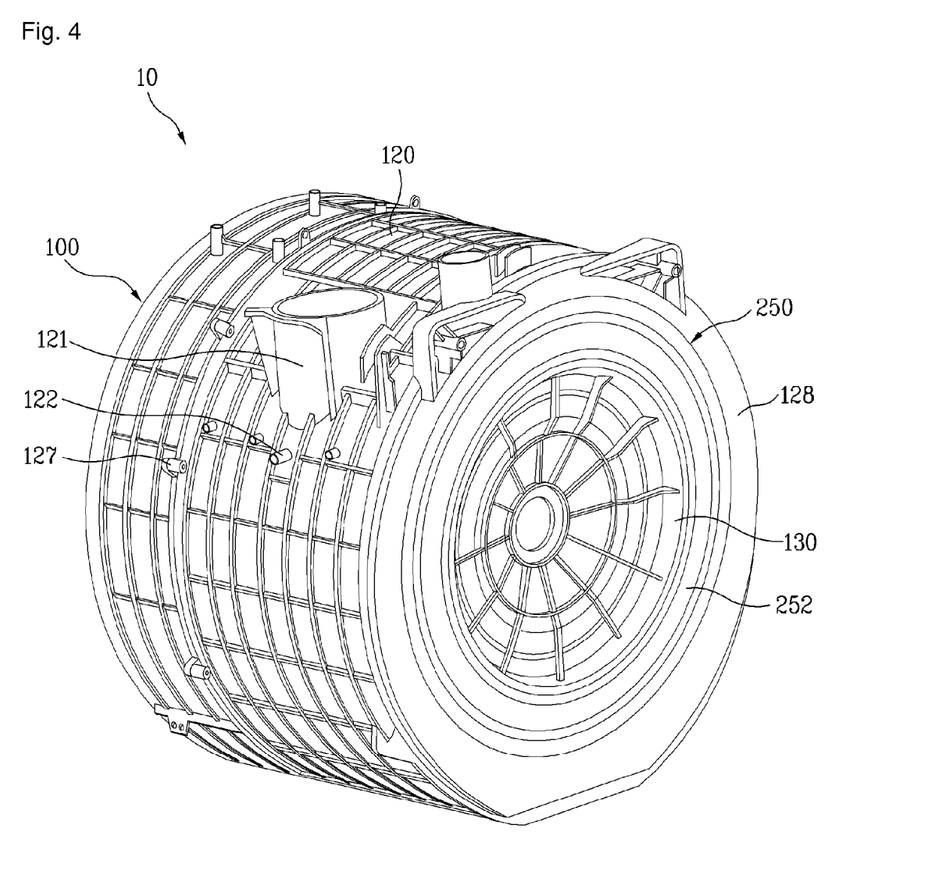
FIG. 4 is a rear perspective view illustrating a tub rear of the laundry machine.

FIG. 4 is a diagram illustrating the connection among the tub front 100, the tub rear 120, the tub back 130 and the rear gasket 250.

The tub rear 120 is cylindrical-shaped to surround the drum 30 and a front part of the tub rear is open and a rear part of the tub rear includes a donut-shaped rear surface 128. The front part is sealing-coupled to the tub front 100. A diameter of the rear surface 128 of the tub rear 120 is larger than an outer diameter of the tub back 130. Even when the tub back 130 is vibrated, the tub back 130 is distant from the tub rear 120 enough not to interfere with the rear surface 128 of the tub rear 120.

The rear gasket 250 is provided between the rear surface 128 of the tub rear 120 and the tub back 130. The rear gasket 250 seals the rear surface 128 of the tub rear 120 and the tub back 130 and it includes a corrugated part 252 flexible enough not to interfere with the vibration of the tub back 130.

A hot air inlet 121 is formed in a predetermined portion of the tub rear 120 in case of the laundry machine having washing and drying functions. In case of the laundry machine only having the washing function, the hot air outlet 121 may be not provided, of course.

An auxiliary structure configured to fixedly support the tub with respect to the base is formed in lower parts of the tub rear 120 and the tub front 100.

Figure 6:
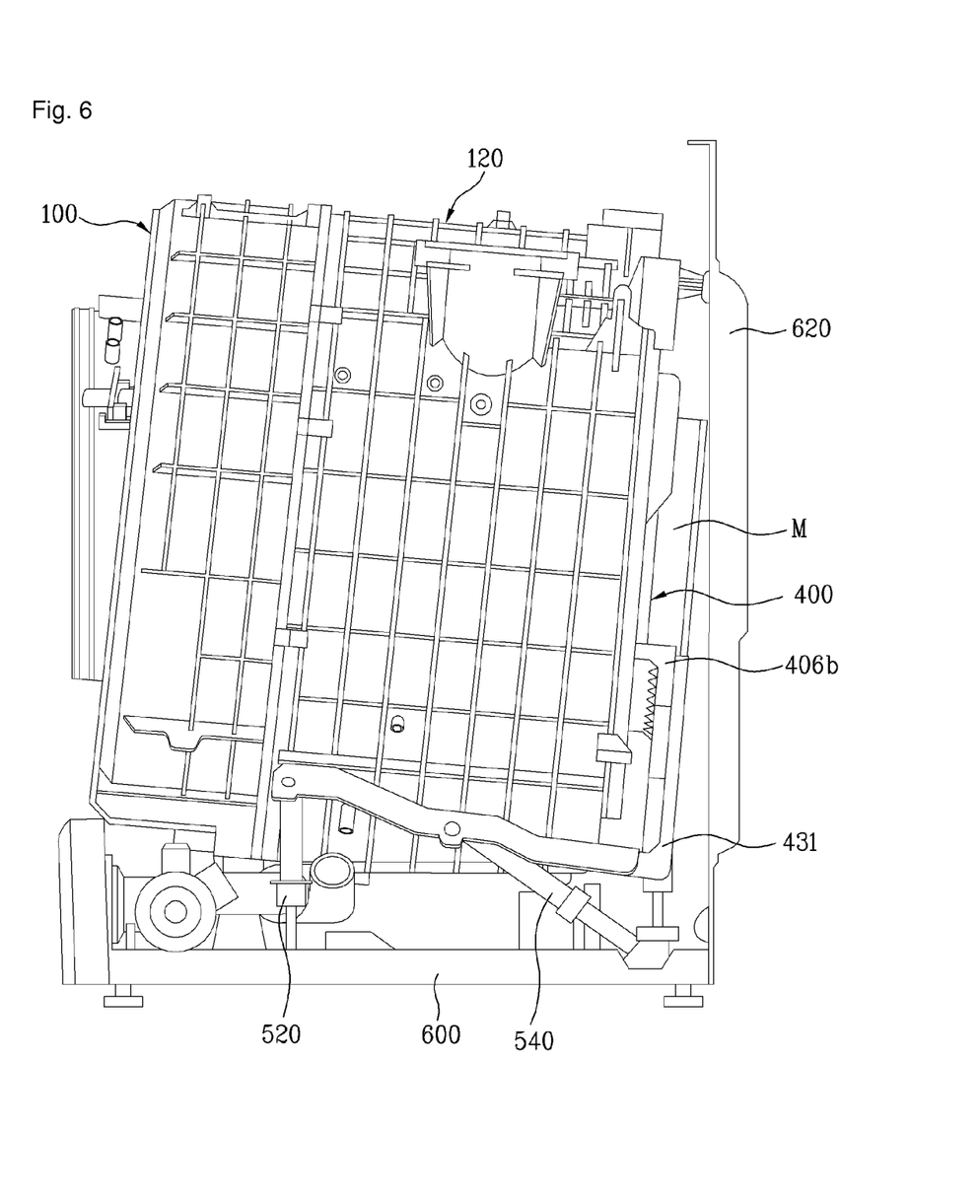
FIG. 6 is a side view illustrating a coupling state between the tub and the suspension provided in the laundry machine.

FIG. 5 is a diagram illustrating the suspension unit 40 mounted on the base 600. FIG. 6 illustrates a coupling state among the tub 100 and 120, the bearing housing 400 and the suspension unit 40.

The bearing housing 400 include a bearing supporting part 401 configured to support a bearing. A tub back securing part 407 configured to secure the tub back 250 thereto is formed in a front portion of the bearing housing 400 and a stator securing part 402 configured to secure the stator of the motor thereto is formed in a rear portion of the bearing housing 400.

Here, the suspension unit 40 includes a first oblique bracket 431, a second oblique bracket 430, a first suspension bracket 450 and a second suspension bracket 440.

A first extending part 406*a* and a second extending part 406*b* extended from right and left side portions of the bearing housing 400 in a radius direction, respectively. The first oblique bracket 431 and the second oblique bracket 430 are connected to the first extending part 406*a* and the second extending part 406*b*, respectively. The first suspension bracket 450 and the second suspension bracket 440 are connected to the first oblique bracket 431 and the second oblique bracket 430, respectively.

Here, the shapes of the first extending part 406*a*, the first oblique bracket 431, and the first suspension bracket 450, the second extending part 406*b*, the second oblique bracket 430 and the second suspension bracket 440 are corresponding to each other. When the laundry is loaded in the drum, the first and second oblique brackets 431 and 430 are used to balance the center of gravity and they are used as mass in the vibration system of the drum.

The suspension unit 40 includes a first spring cylinder damper 520, a second spring cylinder damper 510 and a third spring cylinder damper 500 which are arranged vertically for the vertical suspension and a first cylinder damper 540 and a second cylinder damper 530 which are arranged obliquely for the backward suspension.

Here, a single one of the first spring cylinder damper 520, the second spring cylinder damper 510 and the third spring cylinder damper 500 may be arranged in a rear portion and the other two may be arranged in front right and left portions with respect to a center of the base 600. The first cylinder damper 540 and the second cylinder damper 530 may be arranged oblique forward and backward from rear right and left sides with respect to the center of the base 600, respectively.

Specifically, the first spring cylinder damper 520 is connected between the first suspension bracket 450 and the base 600. The second spring cylinder damper 510 is connected between the second suspension bracket 440 and the base 600. The third spring cylinder damper 500 is directly connected between the bearing housing 400 and the base 600.

The first cylinder damper 540 is obliquely installed between the first suspension bracket 450 and a rear portion of the base and the second cylinder damper 530 is obliquely installed between the second suspension bracket 440 and a rear portion of the base 600.

That is, the third spring cylinder damper 500 is arranged in a center of the rear portion and the first spring cylinder damper 520 and the second spring cylinder damper 510 are arranged in right and left sides of the rear portion. The first cylinder damper 540 and the second cylinder damper 530 are located on right and left sides of the third spring cylinder damper 500. That is, the spring cylinder dampers 500, 510 and 520 and the cylinder dampers 530 and 540 are vertically symmetrical.

As follows, the connecting structure of the tub back 130 and the bearing housing 400 of the laundry machine according to the present invention will be described.

Figure 7:
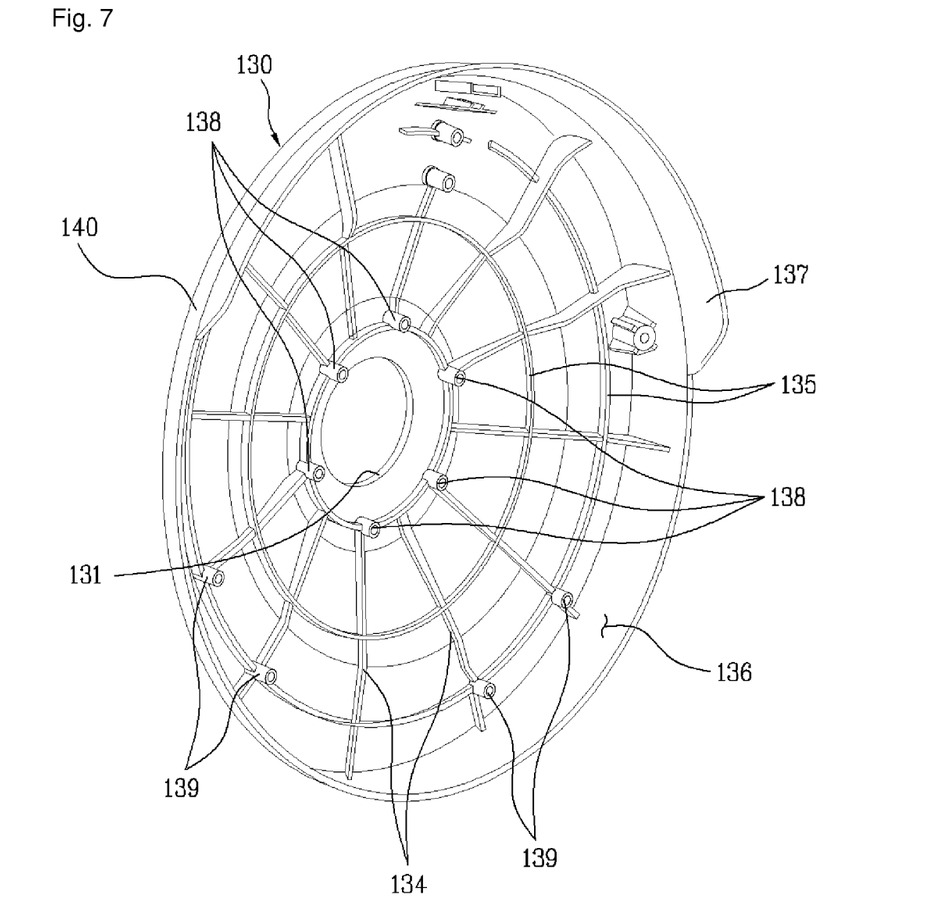
FIG. 7 is a perspective view illustrating a tub back of the laundry machine.
Figure 8:
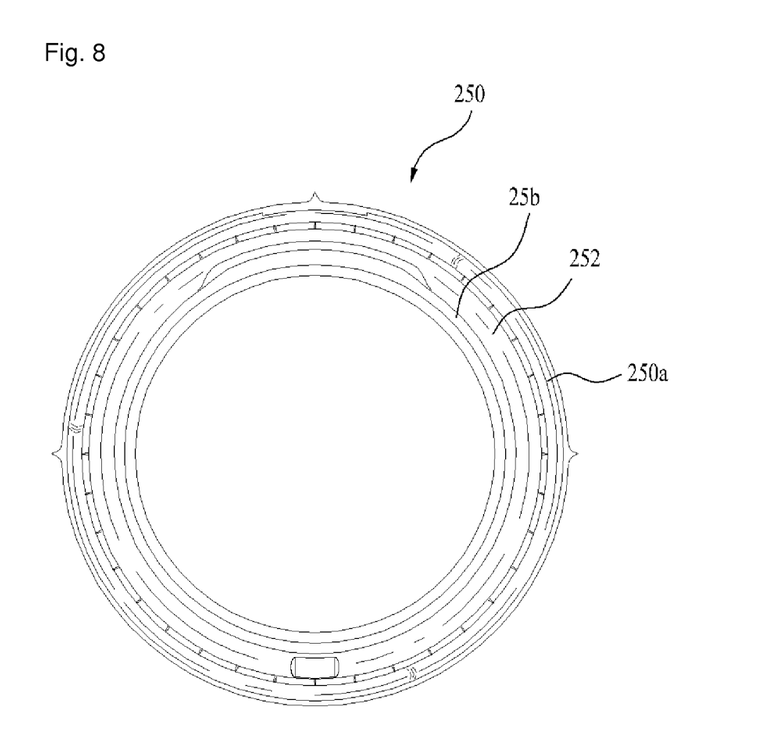
FIG. 8 is a perspective view illustrating a rear gasket of the laundry.

FIG. 7 is a perspective view illustrating the tub back of the laundry machine and FIG. 8 is a perspective view illustrating the rear gasket of the laundry machine.

As shown in FIG. 7, the tub back 130 is coupled to the rear of the tub rear 120 by the rear gasket 250. For that, the rear gasket 250 is formed of a small disc-shape which is smaller than a hollow formed in the tub rear 120. such the tub back 130 may be fabricated of synthetic resin injection-molded to keep the sealing with the rear gasket 250 which will be described later and to present fabrication convenience.

A through-hole 131 is formed in a center of the tub back 130 to pass the shaft 351 connected to the drum 30 there through. A plurality of ribs 134 and 135 and bosses 138 and 139 may be formed in the rear surface 128 of the tub back 130 to reinforce the rigidity of the tub back 130 and the coupling with the bearing housing 400.

The plurality of the ribs 134 and 135 may be formed along an outer circumferential surface of the through-hole 131 to reinforce the rigidity of the tub back 130. the ribs 134 and 135 includes radial ribs 134 extended from the through-hole 131 in a radial shape and circular ribs 135 loaded from the through-hole 131 in a circular shape. The number of the radial ribs 134 and the circular ribs 135 may be increased or decreased to reinforce the rigidity of the tub back 130.

A rim part 136 having a predetermined height is formed in an outer circumferential surface of the tub back 130, a rear gasket coupling part 140 is formed in an outer circumferential surface of the rim part 136 and a water wall 137 is formed in an upper portion of the rim part 136 of the tub back 130 to prevent water having leaked through the outer circumference of the tub back from flowing into the motor located in the center of the tub back.

Such the rim part 136 is coupled to the bearing housing 400, surrounding the bearing housing, and the rear gasket coupling part 140 formed in the rim part 136 locates the bearing housing in the tub 10 substantially. In this case, a more installation space between the bearing housing 400 and the motor (M) secured to the bearing housing 400 may be secured advantageously.

In the meanwhile, a plurality of coupling bosses 138 may be formed in the radial ribs 134 and the circular ribs 135 to couple the bearing hosing 400 to the tub back 130. The coupling bosses may be formed in intersection points of the radial ribs 134 and the circular ribs 135.

Figure 9:
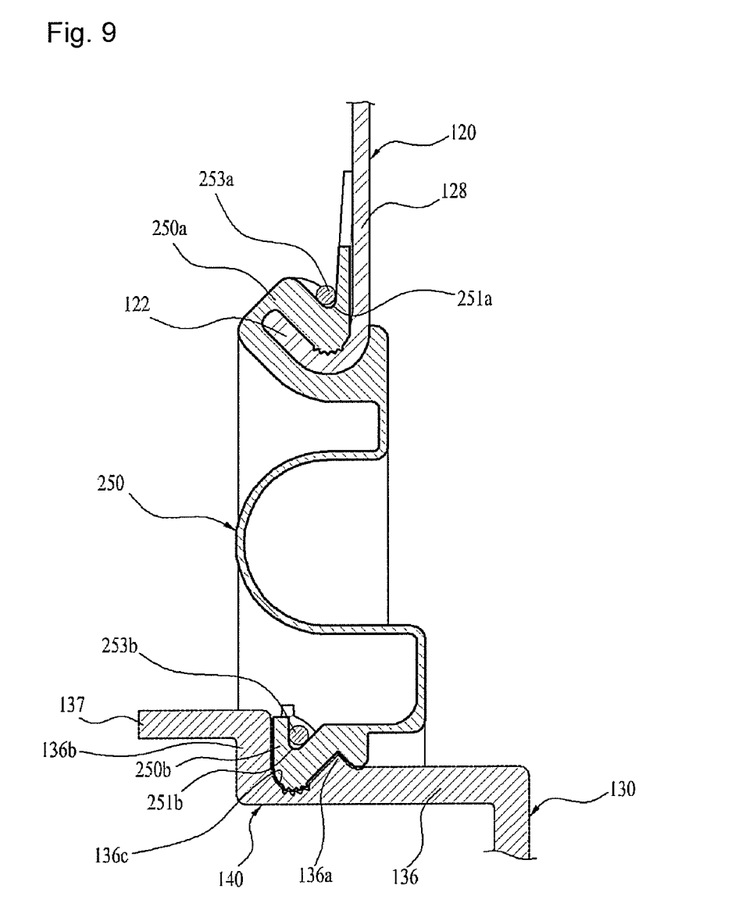
FIG. 9 is a sectional view illustrating a coupling state among the tub rear, the rear gasket and the tub back.

In reference to FIGS. 8 and 9, a rear-gasket-outer-circumference-coupling part 122 is formed in an inner circumference of the rear surface 128 of the tub rear 120 and the rear-gasket-outer-circumference-coupling part 122 is extendedly bending backward, that is, outward with respect to a radial direction.

In addition, a seating part 136b is formed in the rim part 132 of the tub back 130 and the seating part 136b is extended in a radial direction partially or all along a circumference of the rim part 136. A seating rib 136a is formed in an outer surface of the rim part 136. A recess 136c is formed between the seating rim 136a and the seating part 136b.

A tub rear coupling part 250a is formed in an outer circumference of the corrugated part 252 of the rear gasket 250 and a tub back coupling part 250b is formed in an inner circumference of the corrugated part.

The tub rear coupling part 250a is surroundingly coupled to the rear-gasket-outer-circumference-coupling part 122 formed in the tub rear 120. A first inserting recess 251a is formed in an outer circumferential surface of the tub rear coupling part 250a, corresponding to the bent portion of the rear-gasket-outer-circumference-coupling part 122.

The tub back coupling part 250b is correspondingly coupled to the seating part 136b, surrounding the seating part 136b formed in the rim part 136 of the tub back 130. A second inserting recess is formed in an outer circumferential surface of the tub back coupling part 250b, corresponding to the recess 136c formed between the seating part 136b and the seating rib 136a of the rim part 136.

First and second coupling rings 253a and 253b are inserted in the first and second inserting recesses 251a and 251b, respectively. The first coupling ring 253a presses the tub rear coupling part 250a of the rear gasket 250 toward the center of the tub rear 120 to couple the rear gasket 250 to the tub rear 250. the second coupling rim 253b presses the tub back coupling part 250b of the rear gasket 250 toward the center of the tub back to couple the rear gasket 250 to the tub back 130 (see, FIG. 10).

Figure 10:
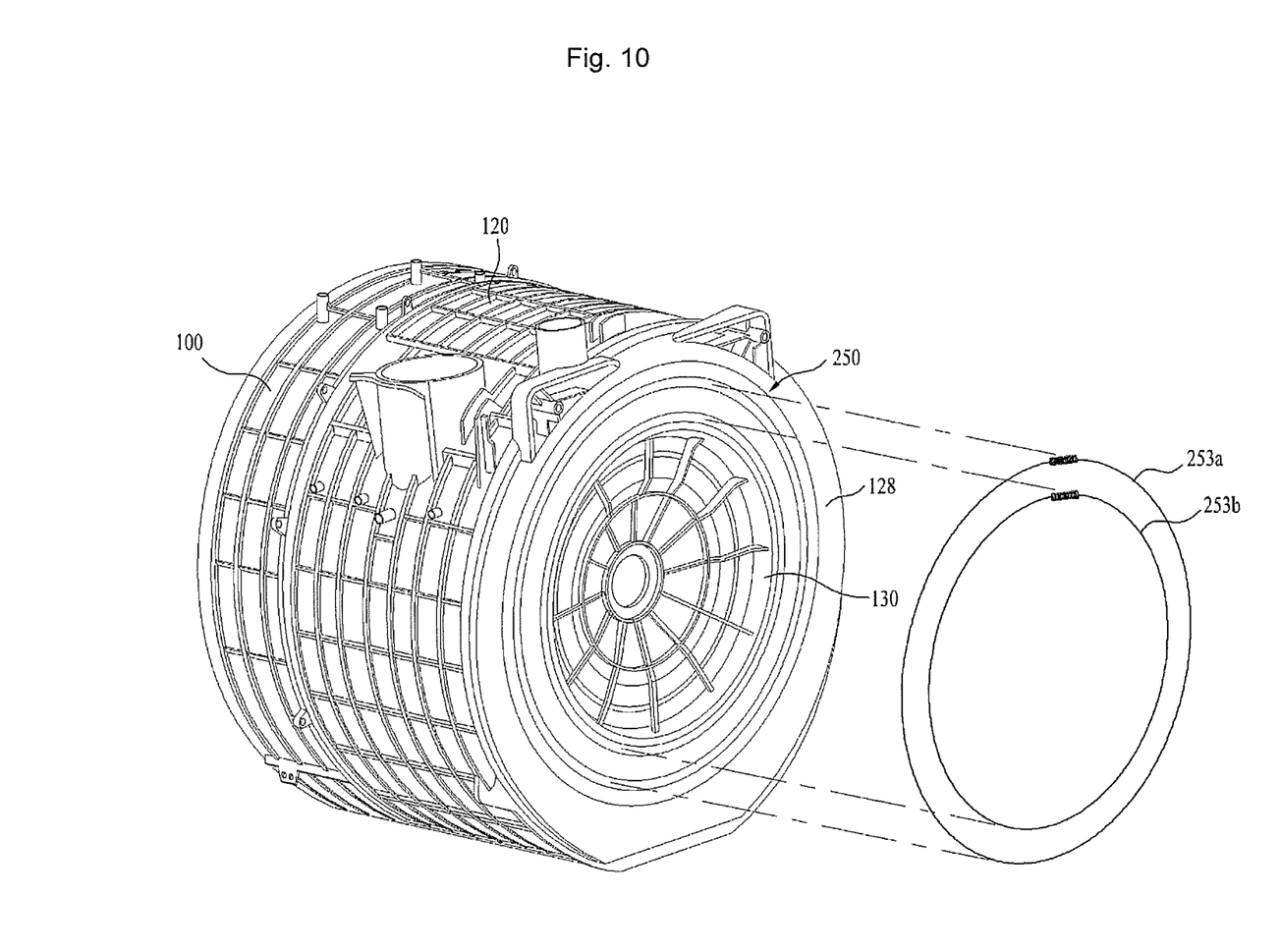
FIG. 10 is a perspective view illustrating the rear gasket of the laundry machine.

Here, the direction of the press applied to the second coupling ring 253b is from an outer circumference of the rim part 136 of the tub back 130 toward the center of the tub back 130. That is, when the tub is vibrated during the vibration of the drum 30, the press is applied in parallel to the vibration direction of the tub back 130.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:
1. A laundry machine, comprising:
a tub to receive wash water and comprising a rear-gasket-outer-circumference-coupling portion formed in an inner circumference of a rear surface of the tub and bent to extend in a rearward direction of the tub;
a drum rotatably disposed in the tub;
a shaft connected to the drum;
a bearing housing to support the shaft;
a tub back comprising a rim that extends in the rearward direction from the tub and coupled to the bearing housing at a front portion of the bearing housing and a seat formed in the rim that extends in a radial direction partially or all along a circumference of the rim;
a rear gasket comprising a tub coupling portion formed at an outer circumference of the rear gasket and a tub back coupling portion formed at an inner circumference of the rear gasket;
a first coupling ring pressed into the tub coupling portion to couple the rear-gasket-outer-circumference-coupling portion thereto;

a second coupling ring pressed to the tub back coupling portion to couple the seat thereto; and a suspension configured to reduce vibration of the drum, wherein the first coupling ring and the second coupling ring are coupled to the tub coupling portion and the tub back coupling portion, respectively, in a forward direction from a rear of the tub.

2. The laundry machine as claimed in claim 1, wherein the rear gasket surrounds the rim in a circumferential direction and the rim is supported by the bearing housing in a radial direction.

3. The laundry machine as claimed in claim 1, wherein a circumferential surface of the rim of the tub back to which the rear gasket is coupled is smooth.

4. The laundry machine as claimed in claim 1, wherein the radially extended circumferential portion sits on a front surface of the bearing housing.

5. The laundry machine as claimed in claim 1, wherein the tub back comprises a plurality of ribs on a rear surface thereof.

6. The laundry machine as claimed in claim 5, wherein the plurality of ribs comprises a plurality of radially extended ribs and a plurality of circumferentially extended ribs.

7. The laundry machine as claimed in claim 1, wherein a front surface of the tub back is smooth.

8. The laundry machine as claimed in claim 1, wherein the suspension is connected to the bearing housing.

9. The laundry machine as claimed in claim 1, wherein the tub is supported more rigidly than the drum is supported.

10. The laundry machine as claimed in claim 1, wherein a rear surface of the tub, the tub back, and the rear gasket form a rear side of the tub.

11. The laundry machine as claimed in claim 1, wherein the rear gasket is sealed to the tub and the tub back so that water inside the tub does not leak.

12. The laundry machine as claimed in claim 1, wherein the rear gasket is formed of a flexible material such that the rear gasket prevents transmission of vibration from the tub to the tub rear.

13. The laundry machine as claimed in claim 1, wherein the rear gasket is formed of a flexible material having a corrugated portion that allows relative movement of the tub back without interference with the tub.

14. The laundry machine as claimed in claim 1, wherein the bearing housing rotatably supports the shaft between a motor and the tub back.

15. The laundry machine as darned in claim 14, wherein the drum includes a drum center connected to a front end of the drum and a drum back connected to the drum center, and wherein the drum back is connected to a spider, which is connected to the shaft.

16. The laundry machine as claimed in claim 14, further comprising a cabinet including a cabinet base that supports the bearing housing through the suspension.

17. The laundry machine as claimed in claim 16, wherein the suspension assembly includes a plurality of vertical supporting suspensions that elastically buffers vibration of the drum, a plurality of tilted suspensions that attenuates the vibration and is mounted tilted in a front to rear direction of the cabinet, and a plurality of brackets that connects the bearing housing to the plurality of vertical suspensions and the plurality of tilted suspensions; wherein the plurality of brackets includes first and second radial brackets that extend in a radial direction from the bearing housing, and first and second axial brackets that extend in an axial direction from the first and second radial brackets, respectively; wherein the plurality of vertical supporting suspensions includes first and second cylinder springs connected between the first and second axial brackets and the cabinet base, respectively, and a third cylinder spring connected between the bearing housing and the cabinet base; and wherein the plurality of tilted suspensions includes first and second cylinder dampers mounted tilted between the first and second axial brackets and a rear side of the cabinet base, respectively.

18. The laundry machine as claimed in claim 16, wherein the tub is securely mounted to the cabinet base at a front side and a rear side of the tub at respective base coupling portions provided at the front and rear sides of the tub.

19. The laundry machine as claimed in claim 1, wherein the tub back further comprises a water wall that extends from the tub back in the rearward direction of the tub.

20. The laundry machine as claimed in claim 1, wherein the tub back includes a pass through hole in a center thereof through which the shaft passes.

* * * * *